(No Model.)
J. CLASS.
SAWMILL DOG.
No. 470,543. Patented Mar. 8, 1892.
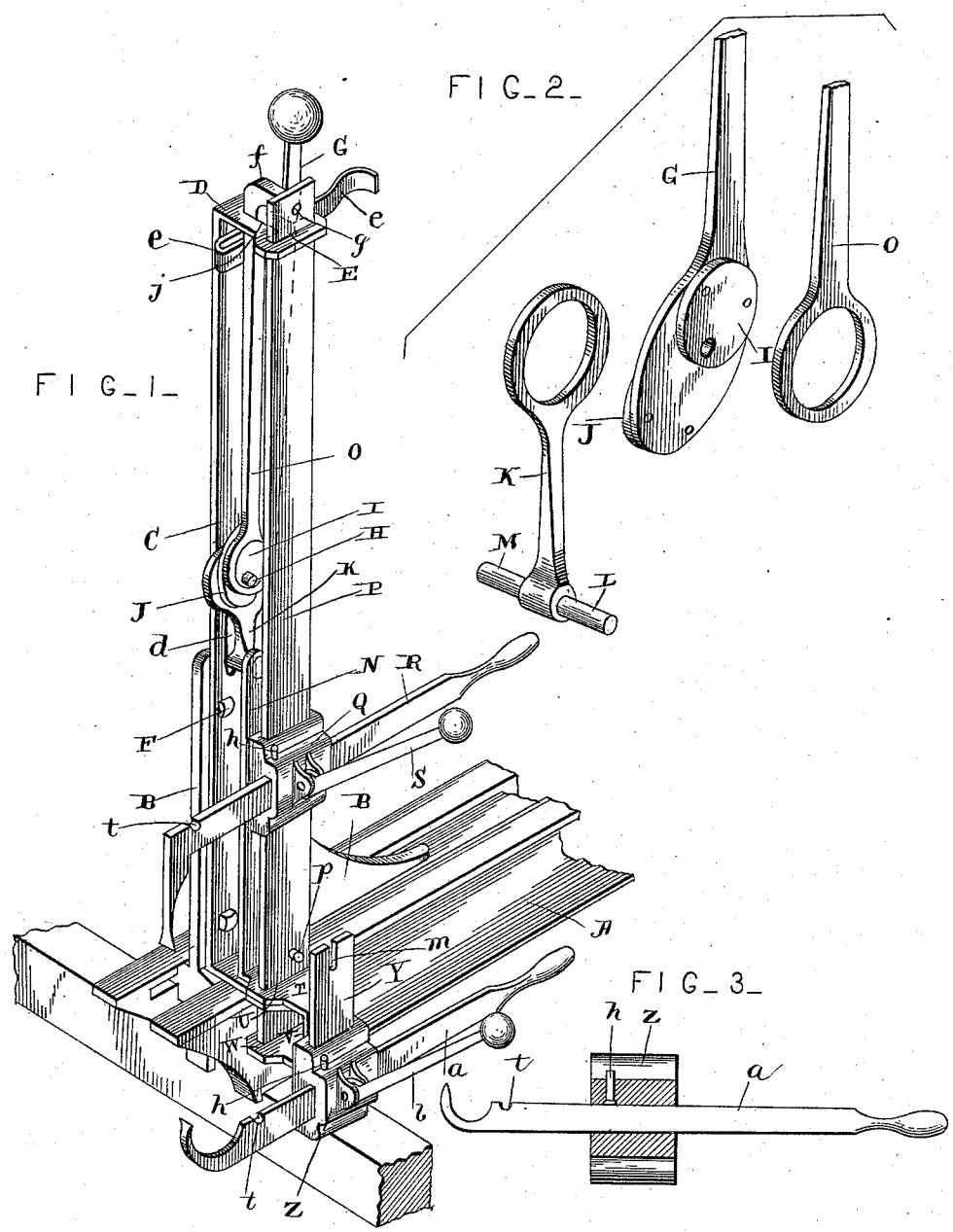
WITNESSES
Geo. E. Frech.
Roland Fitzgerald
INVENTOR
John Class
per Lehmann & Pattison
attys.

UNITED STATES PATENT OFFICE.

JOHN CLASS, OF CANTON, OHIO.

SAWMILL-DOG.

SPECIFICATION forming part of Letters Patent No. 470,543, dated March 8, 1892.

Application filed July 28, 1891. Serial No. 400,921. (No model.)

*To all whom it may concern:*

Be it known that I, JOHN CLASS, of Canton, in the county of Stark and State of Ohio, have invented certain new and useful Improvements in Sawmill-Dogs; and I do hereby declare the following to be a full, clear, and exact description of the invention, such as will enable others skilled in the art to which it pertains to make and use it, reference being had to the accompanying drawings, which form part of this specification.

My invention relates to an improvement in sawmill-dogs; and it consists in the construction and arrangement of parts which will be fully described hereinafter, and particularly pointed out in the claims.

This invention is intended as an improvement upon patents granted to George F. Knight, February 20, 1883, No. 272,838, and October 26, 1880, No. 233,627; and my object is to place both of the dogs of the machine upon the same side of the head-block of the mill-carriage instead of upon opposite sides of the said head-block, as shown in the said Patent No. 272,838, whereby tilting of a short block or log placed thereon and clamped by the dogs is prevented, as will hereinafter appear and the construction of the machine greatly simplified and cheapened.
Another object of my invention is to have the two dogs at one and the same side of the head-block, and the upper dog, which moves downward, inside of the lower dog, which has an upward movement, so that the downward movement of the upper dog will force the log or block being sawed upon the head-block of the carriage and the lower dog, so that there are two bearing-points underneath and one above between the two lower ones which holds the log or block being sawed against tilting.

Another object of my invention is to so construct the dog that it can be applied to the knee of an ordinary sawmill-carriage without specially constructing it to fit the knees and head-blocks of the different makes of mills, which is necessary where one dog is upon one side of the knee and another upon the opposite side of the knee.

In the said patent referred to the two dogs are shown upon opposite sides of the head-block, and owing to this fact the head-block is made a fulcrum between the two, so that when the upper dog moves down and the lower dog moves up the block or log is tilted upon the head-block, as will be readily understood, which is a great disadvantage, and which disadvantage it is the main object of this invention to overcome, as well as to adapt the dog to be applied to the knees of the different makes of mill-carriages without being specially fitted therefor and to cheapen the construction thereof.

In the drawings, Figure 1 is a perspective view of a sawmill-dog which embodies my invention complete. Fig. 2 is a detached perspective view of the pivoted end of the operating-lever and the yokes of the rods which pass around the eccentric upon the said lever. Fig. 3 is a longitudinal vertical section of one of the vertically-adjustable heads, showing a pin for holding the dogs when they are drawn inward.

A indicates the head-block, and B the knee, of an ordinary sawmill-carriage, both of which are of the ordinary construction. Secured to this knee by means of the bolts F or in any other desired manner is a vertically supporting and guiding-bar C, which has its upper and lower ends provided with the horizontally-bent portions D. The ends of these horizontally-bent portions are slightly enlarged, as shown, and these enlargements are provided with the slots E, through which a vertically-reciprocating bar P passes and is guided at its upper and lower ends thereby. Placed upon this bar and sliding vertically thereon is a head Q, which is provided with a horizontal slot or opening, through which slides a horizontally-adjustable dog R, and this dog is firmly held into the desired adjusted position by means of a clamping-lever S. Pivotally connected to the inner side of the said supporting-bar C upon a journal or pin H is a lever G, which is provided with the two eccentrics I J, one of which is above the said pivotal pin and the other below it, for the purpose which will be presently described. A rod O has its lower end provided with a yoke, which passes around the upper eccentric I of the said lever G, and this rod O passes upward through an opening made in the horizontal end of the supporting-bar and has its upper end above this portion D bent outward at right angles, and this bent end is provided with a reduced end $g$, which passes through a corresponding opening made in the extending upper end of the reciprocating bar P. This reduced end $g$ forms a shoulder, which keeps the outer edge of the bar O pressed against the adjacent side of the opening through which it passes. Connecting the slot E and the opening through which the upper end of the said bar O passes is an opening or slot $j$, so that by removing the yoke of this bar from the eccentric the bars P and O can be moved downward and their upper ends removed from the supporting and guiding bar, as will be readily understood, and then by moving the two bars upward the lower end of the bar P will be removed from the guiding-slot at its lower end, which will then entirely detach the two bars from the machine. These bars can be put in place by reversing this operation, which will be found a great convenience in putting the machine together and taking it apart for repairing or for any other purpose.

A rod N has its upper end connected to a journal or pin L, which extends inward from a reciprocating rod K, which rod is provided at its upper end with a yoke, which passes around the eccentric J, which is upon the operating-lever G below the eccentric I. Extending outward from the lower end of this rod K and passing into a slot $d$, made in the supporting-bar C, is a pin or projection M, which guides the rod K and holds it in a vertical line as it is reciprocated by the movement of the operating-lever. The lower end of the rod or bar N is provided with the outwardly-extending horizontal portion T, which is provided with a slot U, through which the lower end of the bar P passes. This bar N is then provided with the vertical portion V and has its lower extremity then bent inward again, as shown at W, and this portion W is provided with a slot, through which the lower extremity of the bar P passes, as shown. Secured to this vertical portion V is a vertical bar Y, which is wider than the portion V, so that its edges project slightly beyond the edges of the portion V, and placed upon this vertical bar Y is a vertically-adjustable head Z, which is similar to the head Q, and through this head passes a dog $a$, which is clamped by the lever $b$.

The downward movement of the adjustable head Q is limited and regulated by the pin or projection $p$, which extends from the bar P, so that when the head is clamped in its lowest position the bar will still be allowed the required downward movement to force the dog R into the log or block being held. In order to allow the lever S sufficient movement to lock this head Q in its lowest position, the upper end of the vertical bar Y is provided with a vertical slot $m$ for the passage of the said lever when it is turned downward for locking the head.

When only one dog is being used, the other dog must be held inward to its greatest extent, so that it will not be engaged by the saw, and in order to automatically hold either or both of the dogs in this position I provide the adjustable heads Q Z with a vertically-movable pin $h$, which has its lower end headed, so that it cannot be pulled upward out of position, and which is passed into position from the under side through the slots which contain the dogs while the dogs are removed therefrom. The inner ends of these dogs are each provided with a notch $t$, into which the lower ends of the pins $h$ drop when the dogs are drawn inward and hold them in this position out of the way of the saw. By raising the pin the dog can be forced outward, and as the pin rests upon the upper smooth edge of the dog it can be adjusted back and forth as desired.

A spring $e$ is placed at the upper end of the supporting-bar C for engaging and holding the upper end of the operating-lever G.

By means of the above construction it will be seen that I produce a sawmill-dog in which the dogs are both placed on the same side of the head-block, giving a double bearing underneath with the pressure of the upper dog between the two said bearings.

Another great advantage of placing the two dogs upon the same side of the head-block, whereby they are supported by a single supporting-bar, is that the invention is adapted to be attached to the knee of an ordinary sawmill carriage without specially constructing it to fit the knees of the different makes of mills and which vary in thickness, height, shape, and holes. Where a dog is constructed like that shown in Patent 272,838, with the dogs upon the opposite sides of the head-blocks, the dog must be constructed especially to fit head-blocks of any and all makes of mills.

The operation of my invention is as follows: When the log or block to be sawed is put in position, the lower dog is raised upward upon the bar Y until it comes in contact with the log or bar and then clamped in this position. The upper dog is then moved down upon the bar P until it is in contact with the upper surface of the log or block and clamped in this position. A downward movement upon the operating-lever G will then pull the bar P, carrying the upper dog downward through the medium of the bar O, and pull the bar N upward, carrying the lower dog through the medium of the bars K and N, which forces each of the dogs into the log or block, while at the same time it is allowed to remain perfectly horizontal upon the head-block.

Having thus described my invention, I claim—

1. In a sawmill-dog, a supporting-bar, an inner reciprocating bar, a guideway for its upper end, a second reciprocating bar placed outside of the said inner bar and having its lower end turned inward and provided with a slot through which the said inner bar passes, this inturned portion having a vertical bar or portion, an adjustable dog placed upon the vertical portion, and an adjustable dog placed upon the said inner bar inside of the said vertical portion, and a means for simultaneously raising and depressing the two bars, respectively, the parts combined substantially as described.

2. In a sawmill-dog, a supporting-bar having its ends turned laterally in the same direction and provided with slots, a reciprocating bar having its ends placed in the said slots, a second reciprocating bar having its upper portion inside of the said bar and its lower portion turned outward and provided with a slot through which the said bar passes, a vertical portion secured to or formed as a part of the outturned portion, an adjustable dog placed thereon, an adjustable dog placed on the bar P, and a means for raising and depressing the two bars respectively and simultaneously, the parts combined substantially as shown.

3. In a sawmill-dog, a supporting-bar C, having its ends turned laterally and provided with slots, a bar P, having its ends placed in the said slots, a bar N, having its upper portion between the support and the bar P and its lower end bent U-shaped, the horizontal portions of the U-shaped bend forming a guideway for the bar P, a vertical bar secured to this bent portion, an adjustable dog placed thereon, a vertical dog placed upon the bar P, and a means for raising and depressing the two bars P N simultaneously, the parts combined substantially as specified.

4. In a sawmill-dog, a supporting-bar, a reciprocating bar P, suitable guideways therefor, a lever G, a rod O, connecting the said bar P and the lever above its pivotal point, a reciprocating bar N, a rod K, connecting the said bar N and the said lever below its pivotal point, having a projection and the supporting-bar, a slot into which the projection extends for the purpose described, and adjustable dogs upon the said bars P and N, the parts combined substantially as set forth.

5. In a sawmill-dog, a supporting-bar having its ends turned outward and provided with openings or slots, a reciprocating bar P, passing through the said slots and carrying a dog, a bar N, having its lower end turned outward and provided with a vertical portion carrying an adjustable dog, an operating-lever, a rod O, connected at its lower end with the said lever and having its upper end to extend through the upper horizontal end of supporting-bar and bent outward and provided with a journal projecting into an opening made in the upper end of the bar P, and a connection between the upper end of the bar N and the lever below its pivotal point, the parts combined to operate substantially as shown.

In testimony whereof I affix my signature in presence of two witnesses.

JOHN CLASS.

Witnesses:
J. A. WANN,
W. F. VOGES.